United States Patent
Boutaghou et al.

[11] Patent Number: 5,898,541
[45] Date of Patent: Apr. 27, 1999

[54] LEADING SURFACE SLIDER MICROACTUATOR

[75] Inventors: Zine-Eddine Boutaghou, Vadnais Heights; Lowell J. Berg, Minnetonka, both of Minn.

[73] Assignee: Seagate Technology, Inc., Scotts Valley, Calif.

[21] Appl. No.: 08/852,087

[22] Filed: May 7, 1997

Related U.S. Application Data

[60] Provisional application No. 60/032,348, Dec. 4, 1996, and provisional application No. 60/031,578, Dec. 5, 1996.

[51] Int. Cl.$^6$ .................................. G11B 5/56; G11B 5/60
[52] U.S. Cl. ...................... 360/109; 360/103; 29/603.01
[58] Field of Search .................................. 360/103, 109; 29/603.03, 25.35, 603.01

[56] References Cited

U.S. PATENT DOCUMENTS

| | | | |
|---|---|---|---|
| 4,620,251 | 10/1986 | Gitzendanner | 360/103 |
| 5,034,828 | 7/1991 | Ananth et al. | 360/103 |
| 5,065,268 | 11/1991 | Hagen | 360/104 |
| 5,079,659 | 1/1992 | Hagen | 360/104 |
| 5,189,578 | 2/1993 | Mori et al. | 360/106 |
| 5,276,573 | 1/1994 | Harada et al. | 360/103 |
| 5,657,188 | 8/1997 | Jurgenson et al. | 360/106 |

OTHER PUBLICATIONS

Fan et al, Magnetic Recording Head Positioning at Very High Track Densities Using a Microactuator–Based Two–Stage Servo System, IEEE Transactions on Industrial Electronics, vol., 42, No. 3, Jun. 1995.

Tang et al, "Silicon Micromachined Electromagnetic Microactuators for Rigid Disk Drives", IEEE Transactions on Magnetic, vol., 31, No. 6, Nov. 1995.

*Primary Examiner*—David D. Davis
*Attorney, Agent, or Firm*—Kinney & Lange, P.A.

[57] ABSTRACT

A slider for attachment to a flexure of a disc drive system includes a slider body, a transducing head formed on the trailing edge of the slider body, and a microactuator formed on the leading edge of the slider body. The microactuator engages the flexure to rotate the transducing head in response to control signals applied to the microactuator. The slider is applicable to achieve fine positioning of the transducing head in a disc drive having an actuator arm supporting the flexure and a motor operable to move the actuator relative to a disc to coarsely position the transducing head. The microactuator and the transducing head may be formed by thin film deposition.

31 Claims, 7 Drawing Sheets

LEADING SURFACE SLIDER MICROACTUATOR

CROSS-REFERENCE TO RELATED APPLICATIONS

This application claims priority from Provisional Application No. 60/032,348 filed Dec. 4, 1996 for "Gimbal for Leading-Edge Actuated Slider" by J. Liu, Z. Boutaghou and L. Berg and Provisional Application No. 60/031,578, filed Dec. 5, 1996 for "Slider-Mounted Piezoelectric Actuator" by Z. Boutaghou and L. Berg. This application is related to Application Ser. No. 08/852,225 filed on even date herewith for "Improved Gimbal Suspension for Supporting a Head in a Disc Drive Assembly" by S. Liu, Z. Boutaghou and L. Berg.

BACKGROUND OF THE INVENTION

The present invention relates to a slider-mounted microactuator for fine positioning of a transducing head over a selected track of a rotatable disc of a disc drive, and more particularly to a piezoelectric microactuator fabricated at the wafer level by conventional thin film techniques used to manufacture the transducing head on the slider.

The density, or radial spacing, between concentric data tracks on magnetic discs continues to increase, requiring greater precision in head positioning. In the past, head positioning was accomplished by operating an actuator arm with a large-scale motor, such as a voice coil motor, to position a head on a gimbal at the end of the actuator arm. The large-scale motor lacks sufficient resolution to effectively accommodate high track-density discs. Thus, a high-resolution head positioning mechanism is necessary to accommodate the more densely spaced tracks.

One promising design for high resolution head positioning involves employing a high resolution microactuator in addition to the conventional low resolution actuator, thereby effecting head positioning through dual-stage actuation. Various microactuator designs have been considered to accomplish high-resolution head positioning, including piezoelectric, electromagnetic, electrostatic, capacitive, fluidic, and thermal actuators. Various locations for the microactuator have been suggested, including at the interface between the gimbal and the slider. However, previous microactuator designs have been directed to microactuators that were fabricated independently of the slider and had to be subsequently attached to the slider. Consequently, the microactuator could not be fabricated during the same thin film wafer processing for manufacturing the slider and transducing head, and additional tooling and assembly steps were required to attach the microactuator to the slider. As a result, the complexity of the manufacturing process was increased and additional design steps, separate from existing manufacturing techniques, were required, making these microactuator designs prohibitively expensive and inefficient to produce.

There is a need in the art for a microactuator design that provides high resolution head positioning and that can be manufactured efficiently and inexpensively. More particularly, there is a need for a microactuator design that can be fabricated onto the slider using existing wafer processing techniques.

SUMMARY OF THE INVENTION

The present invention is a slider for attachment to a flexure of a disc drive system, including a slider body, a transducing head formed on the trailing edge surface of the slider body, and a microactuator formed on the leading edge of the slider body. The microactuator is configured and arranged to engage the flexure to rotate the transducing head in response to control signals applied to the microactuator. In one aspect of the invention, the microactuator is a thin film microactuator and the transducing head is a thin film transducing head.

According to a further aspect of the invention, conductive bond pads are formed on the slider body. Conductive terminals having associated conductive teeth are coupled to the bond pads and interdigitated among a plurality of piezoelectric layers.

The present invention is also directed to a disc drive including a rotatable recording disc having a plurality of concentric tracks, an actuator assembly having an actuator arm, a flexure, and a slider supported by the flexure. The slider includes a transducing head integrally formed on its trailing edge surface and a microactuator integrally formed on its leading edge. A motor is operatively connected to the actuator arm to move the actuator assembly relative to the recording disc to coarsely position the transducing head relative to a selected track of the disc. The microactuator is operable to rotate the slider and the transducing head relative to the flexure to finely position the transducing head relative to the selected track. According to yet another aspect of the invention, the flexure includes a tab against which the microactuator reacts to rotate the slider.

A still further aspect of the invention is a process for manufacturing a slider for attachment to a flexure in a disc drive. A slider body is provided, and a transducing head is formed on the trailing edge of the slider body by thin film deposition. A microactuator is formed on the leading edge of the slider body, and includes a stack containing a plurality of thin film selectively polarized piezoelectric crystal layers interdigitated with a plurality of conductive finger layers. A first end layer of the stack is operatively supported by the leading edge of the slider body, and a second end layer of the stack opposite the first end layer is adapted to be operatively mounted to the flexure. Conductive bond pads are formed on the slider body for electrical connection to groups of alternate ones of the plurality of conductive finger layers.

DETAILED DESCRIPTION OF THE PREFERRED EMBODIMENTS

Figure 1:
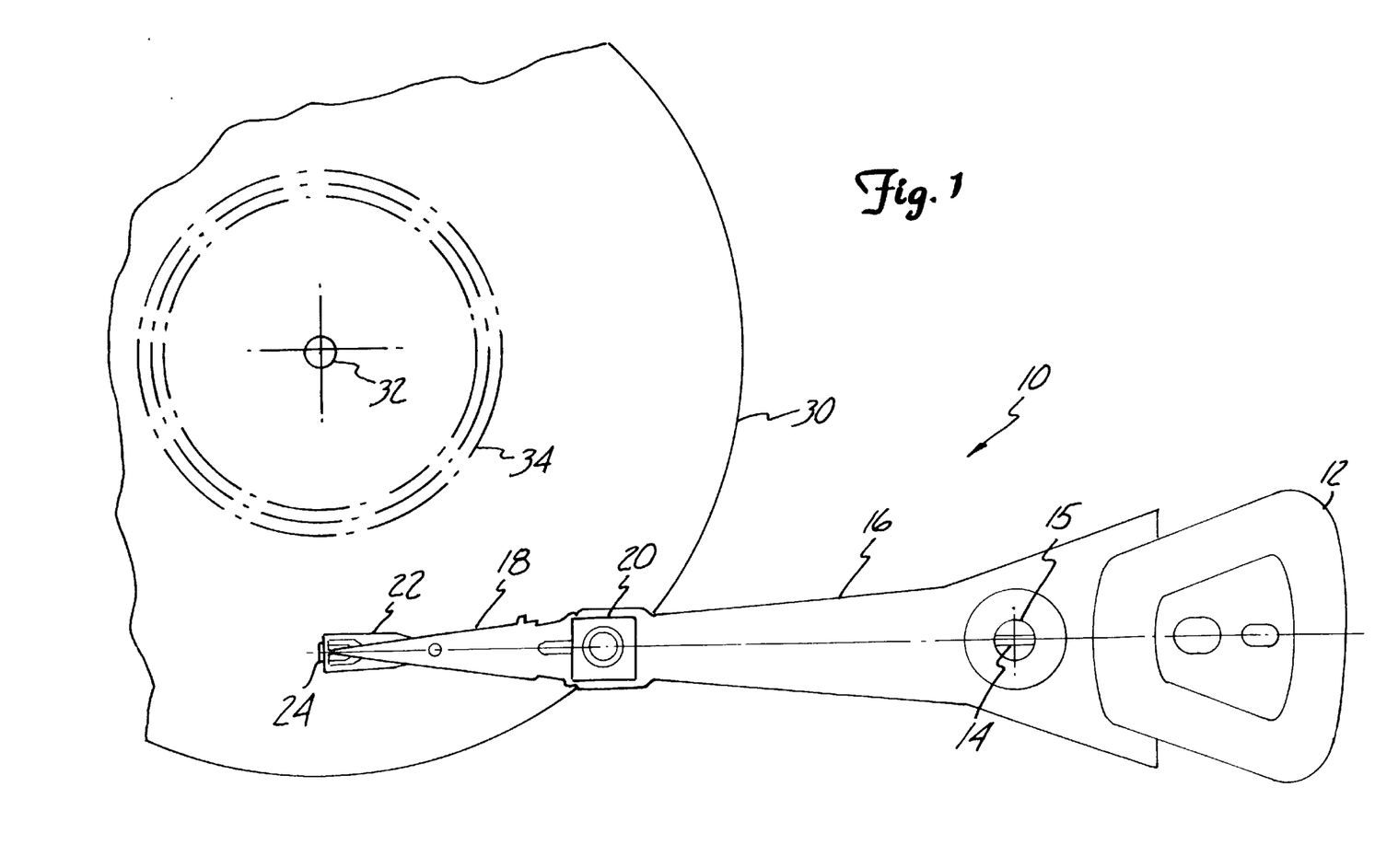
FIG. 1 is a top view of a disc drive actuation system for positioning a slider over tracks of a disc.

FIG. 1 is a top view of a disc drive actuation system 10 for positioning slider 24 over a track 34 of disc 30. Actuation system 10 includes voice coil motor (VCM) 12 (magnets not shown) arranged to rotate actuator arm 16 around axis 14. Head suspension load beam 18 is connected to actuator arm 16 at head mounting block 20. Flexure 22 is connected to an end of head suspension load beam 18, and carries slider 24 a small distance above the surface of disc 30. Slider 24 carries a transducing head (not shown in FIG. 1) for reading and/or writing data on tracks 34 of disc 30. Disc 30 rotates around axis 32, so that windage is encountered by slider 24 to keep it aloft over the surface of disc 30.

VCM 12 is selectively operated to move actuator arm 16 around axis 14, thereby moving slider 24 between tracks 34 of disc 30. However, for disc drive systems with high track density, VCM 12 lacks sufficient resolution and frequency response to position a transducing head of slider 24 over a selected track 34 of disc 30. Therefore, a higher resolution microactuator is also necessary.

Figure 2:
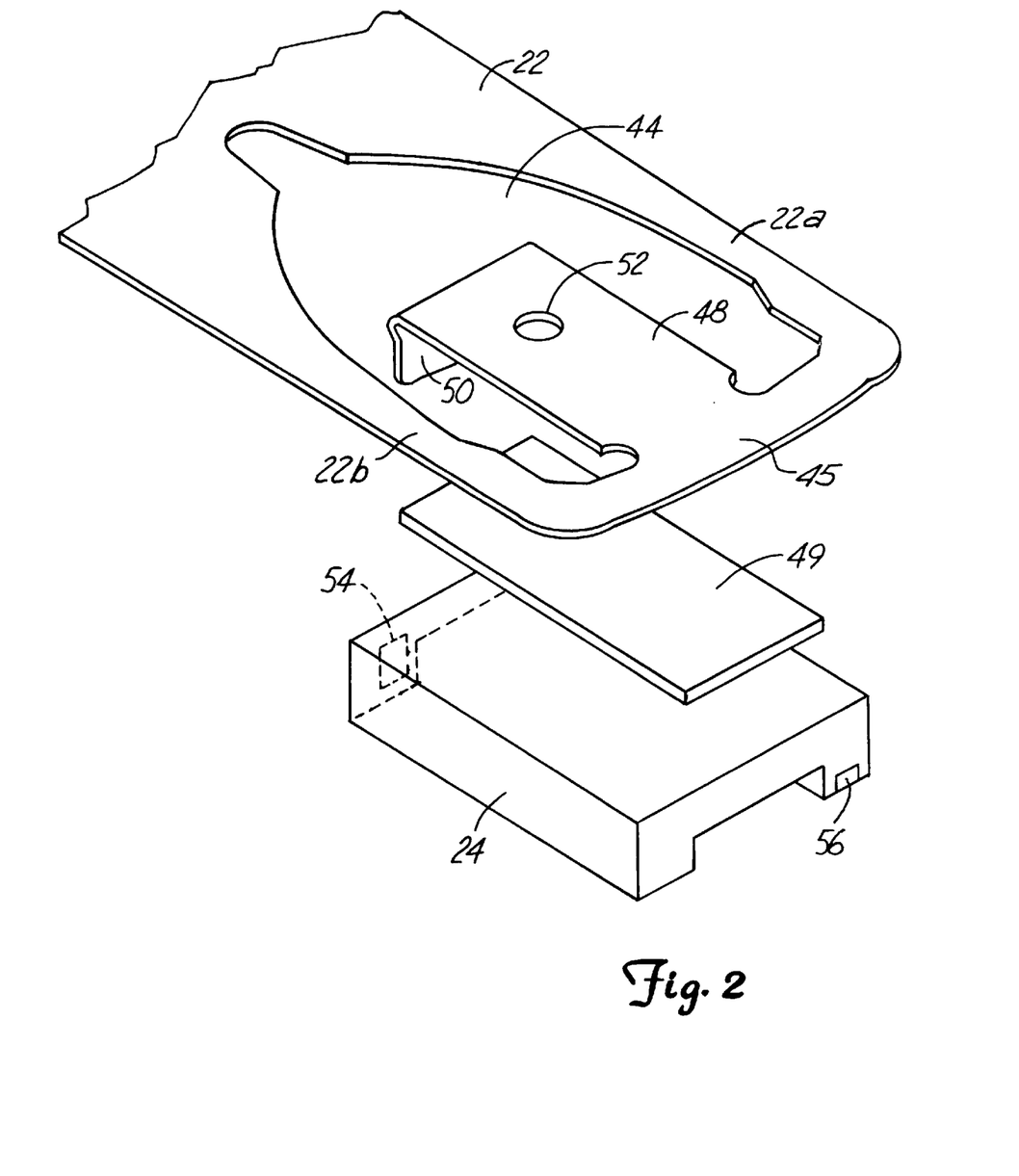
FIG. 2 is an exploded perspective view of a portion of a disc drive system implementing a piezoelectric microactuator at a leading edge of a slider according to the present invention.

FIG. 2 is an exploded perspective view of a portion of a disc drive system implementing a leading edge slider microactuation system according to the present invention. The disc drive system includes a gimbal or flexure 22 mounted to the underside of a distal end of load beam 18 (see FIG. 1). Flexure 22 includes arms 22a and 22b forming aperture 44 therebetween to provide resilience or spring flexure to gimbal or flexure 22. The distal ends of arms 22a and 22b are connected via cross beam 45. Central tongue 48 extends from cross beam 45 into aperture 44 in a plane generally parallel to a plane defined by flexure arms 22a and 22b. Tongue 48 is lengthened relative to gimbals of the prior art, extending beyond the leading edge surface of slider 24. Tongue 48 includes aperture 52, through which load beam 18 (FIG. 1) on actuator arm 16 applies a pre-load force to slider 24. The portion of tongue 48 extending beyond the leading edge surface is bent downward into a right angle to form a flexure tab surface 50, which is generally parallel to the leading edge surface of slider 24. Slider 24 is adhesively attached to flexure tab surface 50, preferably where microactuator 54 is formed on the leading edge surface of slider 24. Optional shear layer 49 may be provided between tongue 48 and slider 24 to minimize the wear on slider 24. Alternatively, a relatively small amount of lubricant may be employed between slider 24 and tongue 48 to achieve a similar result. The structure and components of gimbal 22 are described in greater detail in copending application U.S. Serial No. 08/852,225 for "Improved Gimbal Suspension for Supporting a Head in a Disc Drive Assembly" by J. Liu, Z. Boutaghou and L. Berg, filed on even date herewith, which is hereby incorporated herein by reference in its entirety.

VCM 12 is operated to move actuator arm 16 and load beam 18 to coarsely position transducer 56, which is supported by slider 24, to various positions with respect to tracks 34 on surface of disc 30 confronting the transducer. Microactuator 54 is formed at the leading edge of slider, and cooperates with tab surface 50 to distortionally rotate slider 24 and thereby alter the position of transducing head 56 located at the trailing edge of slider 24. In some embodiments, a second microactuator is formed near the opposite side of the leading edge surface of slider 24, operating in cooperation with microactuator 54 to distortionally rotate slider 24. The specific operation of microactuator 54 and other alternative microactuators is discussed in detail below with respect to FIGS. 3–8.

Figure 3:
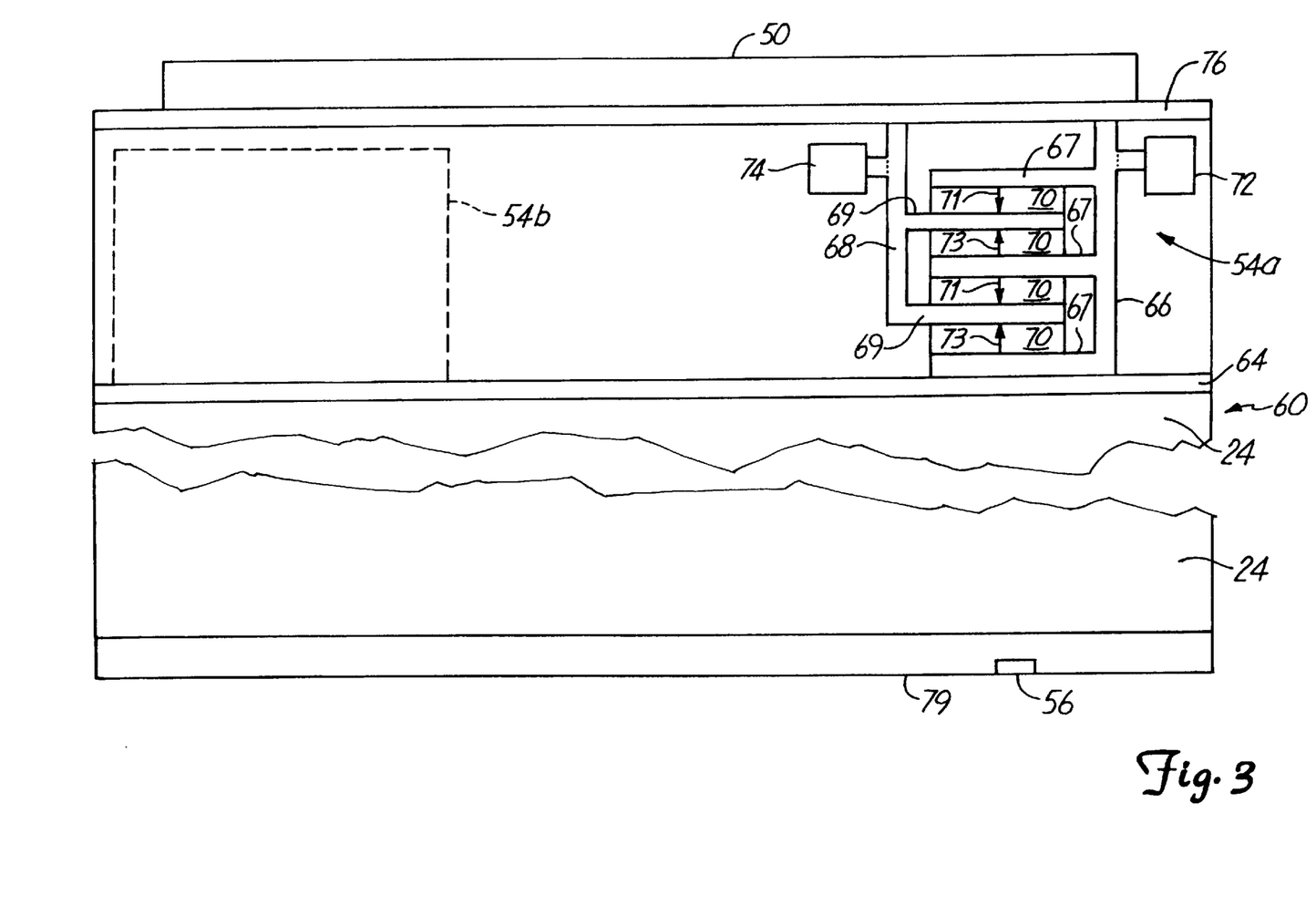
FIG. 3 is a top view of a slider microactuator system utilizing a stacked piezoelectric microactuator according to a first embodiment of the present invention.

FIG. 3 is a top view of a slider/microactuator system 60 utilizing a stacked piezoelectric microactuator 54a and 54b according to the present invention. Microactuator 54b is identical to, or alternatively is a mirror image of, microactuator 54a, so only microactuator 54a is shown in detail in FIG. 3. Microactuator 54a is formed on insulating base coat 64 on the leading edge of slider substrate 24. Transducing head 56 is located at trailing edge 79 of slider 24. Microactuator 54a includes right conductive terminal 66 having associated conductive teeth 67, and left conductive terminal 68 having associated conductive teeth 69. Teeth 67 and 69 are interdigitated between successive piezoelectric layers 70 of a stack of piezoelectric layers. Right bond pad 72 and left bond pad 74 are disposed on the outer surface of microactuator 54a, on the same plane as the top surface of slider 24, for example, for electrical connection to right conductive terminal 66 and left conductive terminal 68, respectively. Alternatively, bond pads 72 and 74 may be disposed on overcoat layer 76 where it extends beyond flexure tab surface 50, or on any other accessible surface of slider 24 or microactuators 54a and 54b. Piezoelectric layers 70 are initially polarized in the directions indicated by arrows 71 and 73, with adjacent piezoelectric layers polarized in opposite directions. Each layer 67, 70 and 69 is formed in succession from the leading edge surface of the slider. After formation of each piezoelectric layer 70, the layer is polarized by applying a large voltage across the layer, thereby orienting the piezoelectric crystals to respond mechanically in a selected direction for an applied voltage across each layer. Alternatively, piezoelectric layers 70 may be poled in full sheet form before application to the previously formed structures. The region surrounding piezoelectric microactuators 54a and 54b is open space or is filled with a compliant material, to allow movement of the components of the microactuators. It is preferred that piezoelectric microactuators 54a and 54b be formed on insulating base coat 64 and slider body 24 by thin-film wafer techniques while transducing head 56 is being fabricated on slider body 24.

The processes for forming transducing head 56 are well known, as are the processes for forming piezoelectric layers. An alternative is to form microactuators 54a and 54b separately, and then laminate them to slider 24, but this process is less desirable because it introduces additional fabrication steps to the process and increases the risk of defective parts.

While the apparatus has been shown in FIG. 3 as employing a pair of complementary stacked piezoelectric microactuators 54a and 54b, a single microactuator may be employed.

In operation, a first voltage is applied to right bond pad 72, so that right conductor 66 and conductive teeth 67 are energized to a first electrical potential. A second voltage is applied to left bond pad 74 to energize left conductive terminal 68 and conductive teeth 69 to a second electrical potential. The difference between the first electrical potential and the second electrical potential across piezoelectric layers 70 causes all of the layers to either expand or contract. Microactuator 54a is adhesively attached to flexure tab surface 50 (see FIG. 2) of the disc drive system, so that expansion or contraction of piezoelectric layers 70 of microactuator 54a applies force against flexure tab surface 50 to cause distortional rotation of slider 24. For example, when all piezoelectric layers 70 of microactuator 54a expand, the force pushing against flexure tab surface 50 causes clockwise distortional rotation of slider 24, thereby moving transducing head 56 at trailing edge 79 of slider 24 in a clockwise arc. In the embodiment where microactuator 54b is also provided, expansion of one microactuator and contraction of the other microactuator complement each other, thereby cooperating to cause distortional rotation of slider 24. Where optional shear layer 49 is included and bonded to both slider 24 and tongue portion 48 (see FIG. 2), the shear layer provides a compliant attachment of the slider to the gimbal, thus permitting the slider to move about the yaw axis (normal to the disc) and thereby permitting distortional rotation of the slider to finely position the transducing head relative to a selected track on the disc. While microactuators 54a and 54b are shown with open space or compliant material between the layers of the microactuators and overcoat 76 abutting flexure tab surface 50, it will be understood that a design arranged such that an end layer of the conductive teeth layers abuts overcoat 76 is also feasible, to push directly against flexure tab surface 50. Thus, selective positioning of transducing head 56 at the trailing edge of slider 24 can be achieved by expanding and contracting piezoelectric layers 70 of microactuator 54a at the leading edge of slider 24, by regulating the voltages applied to right bond pad 72 and left bond pad 74.

The adhesive connection between microactuator 54a and flexure surface 50 at overcoat layer 76 shown in FIG. 3 is exemplary; flexure surface 50 may be oriented and positioned in any manner to achieve adhesive attachment to microactuator 54a, so that expansion or contraction of piezoelectric layers 70 of microactuator 54a causes distortional rotation of slider 24 to position transducing head 56.

Figure 4:
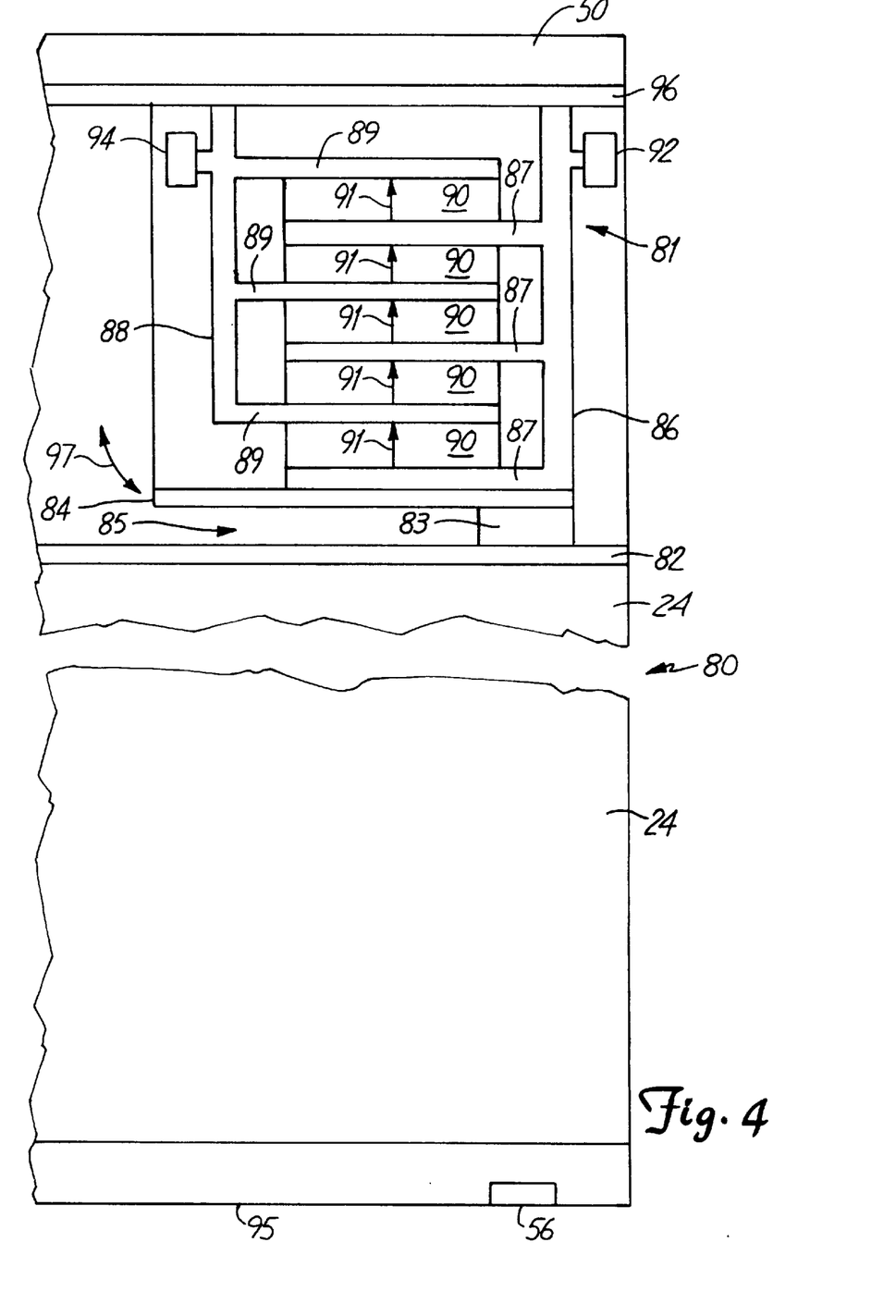
FIG. 4 is a top view of a portion of a slider microactuator system utilizing a bimorph piezoelectric microactuator according to another embodiment of the present invention.

FIG. 4 is a top view of a slider microactuator system 80 according to the present invention. A bimorph piezoelectric microactuator 81 is formed on insulating base coat 82 at the leading edge of slider substrate 24, with an insulation member 83 acting as a hinge and a further insulating layer 84 supporting the layers of microactuator 81. Transducing head 56 is located at trailing edge 95 of slider 24. Bimorph piezoelectric microactuator 81 includes right conductive terminal 86 with associated conductive teeth 87, left conductive terminal 88 with associated conductive teeth 89, piezoelectric layers 90, right bond pad 92, left bond pad 94, and overcoat insulator 96. Gap 85 is formed between base coat 82 and insulating support layer 84 to allow bending with respect to slider 24. Piezoelectric layers 90 are initially polarized in the direction of arrows 91. Each layer 83, 84, 87, 90 and 89 is formed in succession from the leading edge surface of the slider. After formation of each piezoelectric layer 90, the layer is polarized by applying a large voltage across the layer, thereby orienting the piezoelectric crystal so that it responds mechanically in a given direction for an applied voltage across the layer. Alternatively, piezoelectric layers 90 may be poled in full sheet form before application to the previously formed structures. The region surrounding piezoelectric microactuator 81 is open space or is filled with a compliant material, to allow movement of the components of microactuator 81. Piezoelectric microactuator 81 is preferably formed by the same thin-film techniques used to manufacture recording transducer 56. Alternatively, microactuator 81 may be separately formed, and then laminated to slider 24.

In operation, a first voltage is applied to right bond pad 92, so that right conductor 86 and conductive teeth 87 are energized to a first electrical potential. A second voltage is applied to left bond pad 94 to energize left conductive terminal 88 and conductive teeth 89 to a second electrical potential. The difference between the first electrical potential and the second electrical potential across piezoelectric layers 90 causes alternate layers to expand and contract, respectively, creating a concave bending action in the layers. Open space or compliant material is preferably provided between an end layer of the conductive teeth layers and overcoat 96, to permit the concave bending action to occur.

Figure 5A:
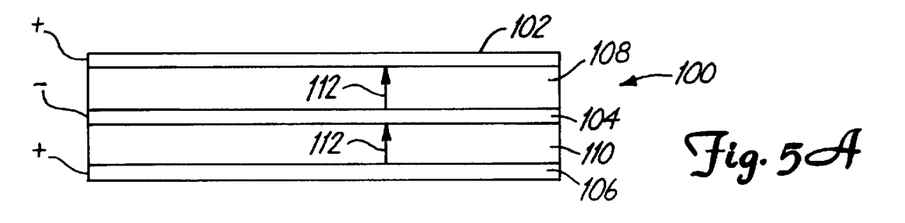
FIGS. 5A and 5B are diagrams useful in explaining the operation of a bimorph piezoelectric bending motor.
Figure 5B:
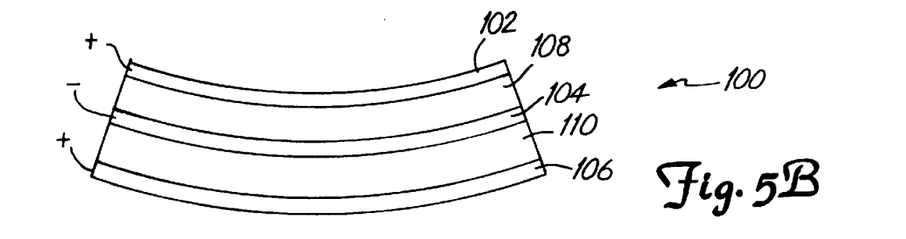

The operation of alternate piezoelectric layers is illustrated in FIGS. 5A and 5B, which show a bimorph piezoelectric bending motor 100 having a layered configuration including, from top to bottom, conductive terminal 102, piezoelectric layer 108, conductive terminal 104, piezoelectric layer 110, and conductive terminal 106. When a positive voltage is applied to terminals 102 and 106 and a negative voltage is applied to terminal 104, motor 100 bends to the actuated state depicted in FIG. 5B. Piezoelectric layers 108 and 110 experience opposite potentials across them, resulting in an increase in the length of piezoelectric layer 110 and a decrease in the length of piezoelectric layer 108, since both are polarized in the same direction, as shown by polarization direction arrows 112. As a result, motor 100 undergoes the bending operation shown in FIG. 5B.

Figure 5C:
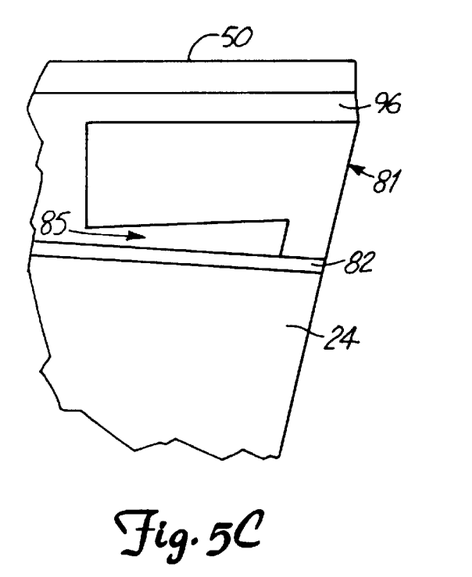
FIGS. 5C and 5D illustrate operation of a bimorph piezoelectric microactuator as in FIG. 4.
Figure 5D:
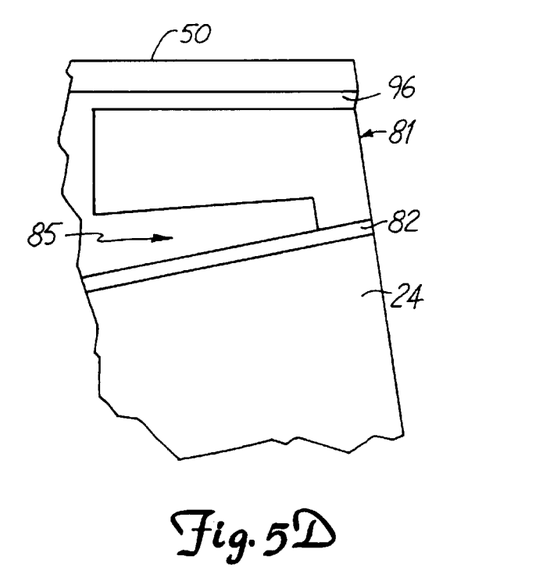

FIGS. 5C and 5D illustrate the effect that bending of the piezoelectric layers of microactuator 81 has on its orientation with respect to slider 24. Because the microactuator reacts against a rigid surface, namely flexure tab surface 50, application of the voltages to achieve the movement depicted in FIG. 5B results in gap 85 between the microactuator and the slider body being opened more widely at the free end, as shown in FIG. 5D, and application of an oppositely polarized voltage results in an opposite movement to close gap 85, as shown in FIG. 5C.

Returning to FIG. 4, the "bowing" force applied due to the alternate expansion and contraction of piezoelectric layers 90 (as illustrated in FIGS. 5A–5D) forces microactuator 81 to bend in the general direction of arrows 97. Because piezoelectric microactuator 81 is adhesively attached to slider substrate 24 by insulating layers 82, 83 and 84, and is also rigidly attached to a flexure (such as at flexure tab surface 50), the force applied to bend microactuator 81 in the direction of arrows 97 causes distortional rotation of slider 24 about insulating layer 83, which acts as a hinge. Thus, selective rotation of slider 24 (and thereby movement of transducing head 56 at trailing edge 95 of slider 24) can be achieved by regulating the voltages applied to right bond pad 92 and left bond pad 94.

The adhesive attachment of microactuator 81 to flexure tab surface 50 in FIG. 4 is exemplary only; microactuator 81 may alternatively be adhesively attached to a flexure of the disc drive system at any of its surfaces. For example, the flexure may attach to a surface of piezoelectric microactuator 81 that is in the same plane as the top of surface of slider 24. Any flexure design that provides adhesive attachment to microactuator 81 so that bending microactuator 81 forces distortional rotation of slider 24 is acceptable.

Figure 6:
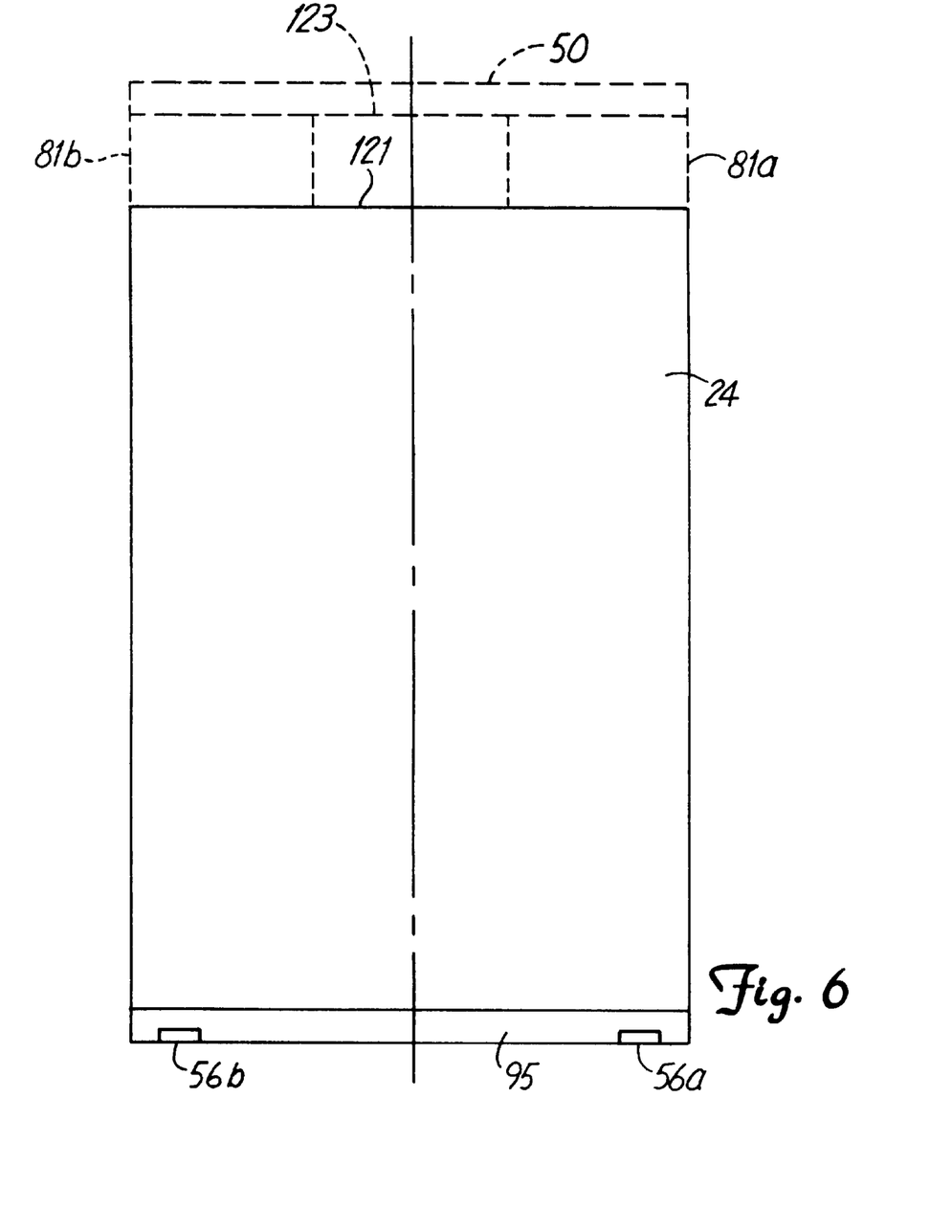
FIG. 6 is a top view of a further embodiment of the slider microactuator system of the present invention, utilizing a pair of bimorph piezoelectric microactuators.

FIG. 6 is a top view of another embodiment of the slider microactuator system according to the present invention, utilizing a pair of bimorph piezoelectric microactuators 81a and 81b. Microactuators 81a and 81b are each formed on slider substrate 24 on leading edge surface 121 in the manner shown in FIG. 4, abutting flexure tab surface 50. Microactuator 81a is configured opposite to microactuator 81b, so that the microactuators will bend in opposite directions to generate maximum deflection of transducers 56a and 56b at trailing edge 95 of slider substrate 24. Preferably, microactuators 81a and 81b are energized with a single circuit, with leads connecting to a single pair of bond pads on overcoat layer 123 where it extends beyond flexure tab surface 50, for example. First and second voltages are applied to microactuators 81a and 81b to generate applied forces in opposite directions with respect to flexure tab surface 50 for each microactuator. These forces are complementary to each other, and cooperate to cause distortional rotation of slider 24 about an axis normal to the disc, located halfway between microactuators 81a and 81b. The operation of each individual microactuator is identical to the operation described with respect to FIG. 4.

Figure 7:
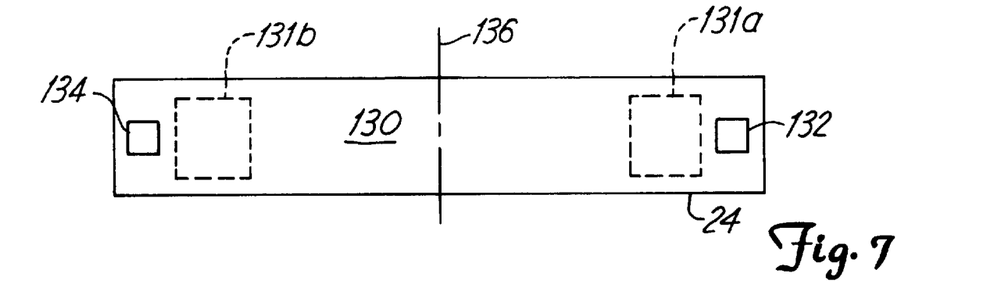
FIG. 7 is an end view of the leading edge surface of the slider microactuator system of the present invention.
Figure 8:
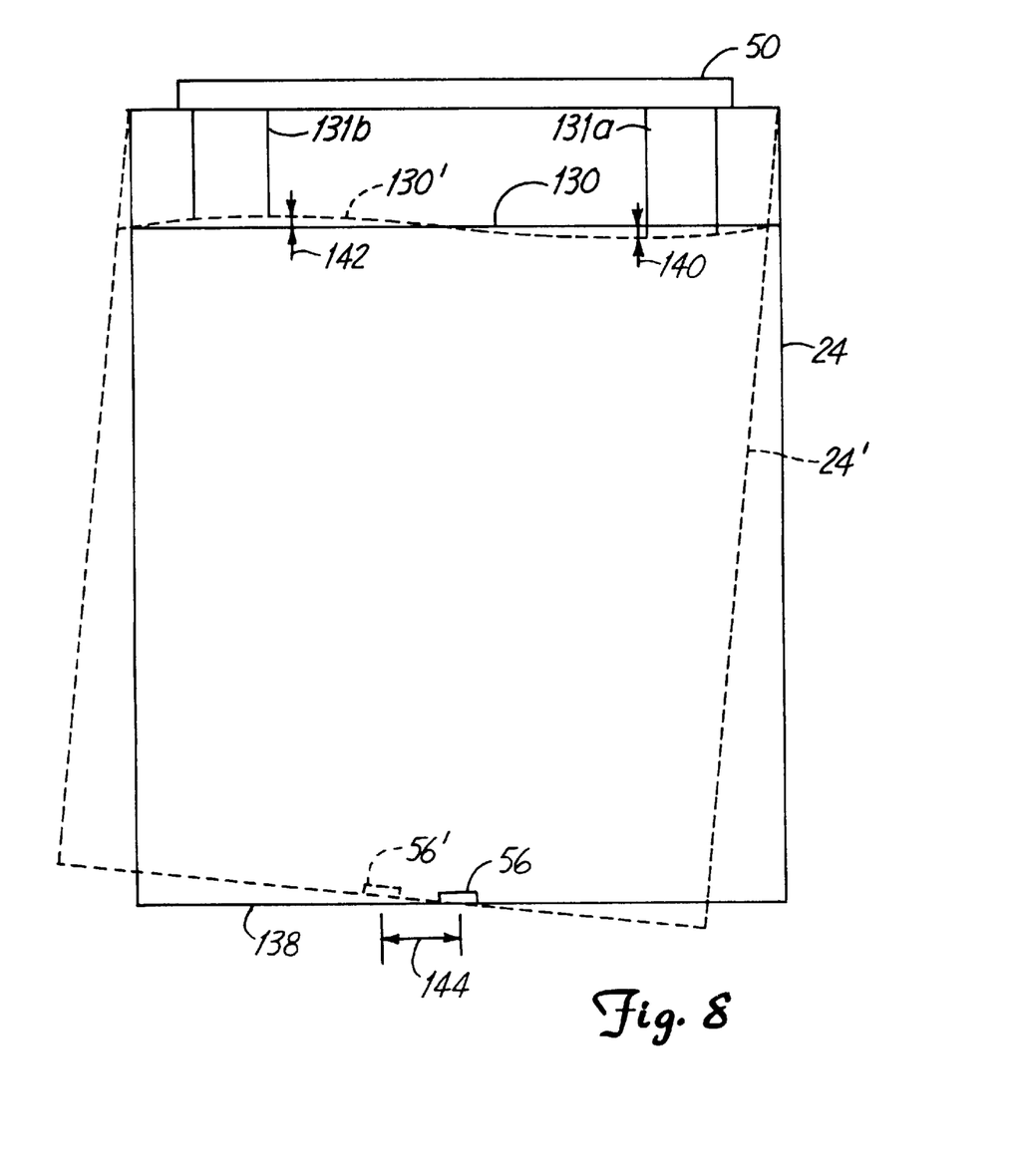
FIG. 8 illustrates operation of the slider microactuator system of the present invention, showing the movement of a transducing head at the trailing edge surface for a given microactuator movement at the leading edge surface.

FIG. 7 is an end view of leading edge surface 130, and FIG. 8 is a top view, of a further embodiment of the slider microactuator system. In this embodiment, piezoelectric microactuators 131a and 131b abut flexure tab surface 50 and are offset from the sides of slider substrate 24. Bond pads 132 and 134 provide the first and second voltages to both microactuators 131a and 131b, the bond pads being formed on leading edge surface 130 of slider substrate 24 between the microactuators and the sides of slider substrate 24. Preferably, microactuators 131a and 131b are offset from yaw axis 136 of slider substrate 24 by an amount equal to at least one-fifth of the length of slider substrate 24. As a result, deformation of microactuators 131a and 131b at leading edge surface 130 is magnified five times at trailing edge surface 138. For a standard model slider 1250 microns long, microactuators 131a and 131b are preferably located 250 microns from yaw axis 136 of slider substrate 24. Thus, a one micron deformation at leading edge 130 (shown at arrows 140 and 142) results in a displacement of transducing head 56 (shown as disposed on a center rail of slider substrate 24) at trailing edge 138 of five microns (shown at arrows 144). The displaced position of slider substrate 24 and head 56 is exemplified in FIG. 8 in dashed lines, as 24' and 56'.

FIG. 8 also shows the distortional rotation of slider 24 as it moves from its rest position shown in solid lines to an actuated position shown in dashed lines. In a manner similar to the operation of microactuator 54a described in FIG. 3, the microactuators 131a and 131b expand and contract, respectively, to distortionally rotate slider 24 about its yaw axis 136. The leading surface 130 of slider 24 distorts as shown at 130' due to the expansion and contraction of the respective microactuators. In an alternative embodiment, flexure tab surface 50 may be designed to be flexible, so that expansion and contraction of the microactuators actually distorts both flexure tab surface 50 and the slider. This arrangement requires less support of flexure tab 50, and results in smaller movements of the slider and transducing head.

The present invention provides a microactuation system that is manufacturable by the same thin film techniques known in the art to manufacture recording heads for disc drives. The various layers of the piezoelectric microactuators may be sequentially formed on the slider substrate while the slider is still embedded in the wafer. Many microactuators may be formed simultaneously by this process. The ease of formation of the microactuators, integrated into the wafer-level process, makes the microactuators of the present invention readily mass producible. The microactuation system enables high resolution positioning of a transducing head, without adding complex machining and tooling issues into the head design process.

Although the present invention has been described with reference to preferred embodiments, workers skilled in the art will recognize that changes may be made in form and detail without departing from the spirit and scope of the invention.

What is claimed is:

1. A slider attached to a flexure of a disc drive system employing a rotatable disc having a plurality of concentric tracks, the flexure having a tab with a surface generally normal to a surface of the rotatable disc, the slider comprising:

a slider body having an air-bearing surface generally parallel to and confronting the surface of the rotatable disc, a leading surface generally normal to the air-bearing surface and a trailing surface opposite the leading surface, the trailing surface being generally normal to the air-bearing surface and the slider being arranged such that the leading surface is adjacent the surface of the tab;

a transducing head at the trailing surface of the slider body; and a microactuator between the leading surface of the slider body and the tab, the microactuator being configured and arranged to apply force to the tab to rotate the slider body to displace the transducing head with respect to the tracks of the disc in response to control signals applied to the microactuator.

2. The slider of claim 1, wherein the microactuator comprises:

first and second conductive bond pads;

a first conductive terminal having first conductive teeth associated therewith, coupled to the first bond pad;

a second conductive terminal having second conductive teeth associated therewith, coupled to the second bond pad; and a plurality of piezoelectric layers interdigitated between the first and second conductive teeth.

3. The slider of claim 2, wherein the microactuator is a thin film microactuator and the transducing head is a thin film transducing head.

4. The slider of claim 2, wherein the microactuator is formed separately from the slider body and transducing head, and including means laminating the microactuator to the slider body.

5. The slider of claim 2, wherein the first and second conductive bond pads are disposed on a top surface, opposite the air-bearing surface, of the slider body.

6. The slider of claim 2, wherein the first and second conductive bond pads are disposed on the leading surface of the slider body.

7. The slider of claim 2, wherein the piezoelectric layers are arranged in a stack with successive piezoelectric layers of the stack being oppositely polarized so that application of a voltage to the first and second conductive bond pads causes the stack to expand or contract.

8. The slider of claim 2, wherein the piezoelectric layers are arranged in a stack with the piezoelectric layers of the stack being polarized to the same orientation so that application of a voltage to the first and second conductive bond pads causes the stack to bend, and further comprising hinge means attaching the stack to the slider body.

9. The slider of claim 8, wherein the hinge means includes a gap between the microactuator and the slider body.

10. The slider of claim 1, further including a second microactuator between the leading surface and the tab, the first-named microactuator and the second microactuator being complementary to each other and offset on opposite sides of a central longitudinal axis of the slider body, the first-named and the second microactuators being configured and arranged to apply force to the tab to rotate the slider body to displace the transducing head with respect to the tracks of the disc in response to control signals applied to the microactuators.

11. The slider of claim 10, wherein the control signals applied to the first-named and the second microactuators to rotate the slider body are applied to first and second conductive bond pads, the first and second conductive bond pads being coupled to the first-named microactuator and to the second microactuator.

12. The slider of claim 10, wherein the control signals applied to the first-named and the second microactuators to rotate the slider body are applied to first and second conductive bond pads and to a third conductive bond pad, the first and second conductive bond pads being coupled to the first-named microactuator and at least one of the first and second conductive bond pads and the third conductive bond pad being coupled to the second microactuator.

13. The slider of claim 10, wherein the control signals applied to the first-named and the second microactuators to rotate the slider body are applied to first and second conductive bond pads coupled to the first-named microactuator, and to third and fourth conductive bond pads coupled to the second microactuator.

14. The slider of claim 1, wherein the flexure is attached to an actuator arm of the disc drive, the flexure including a tongue supporting the tab that is generally parallel to the surface of the disc, and means attaching the microactuator to the tab, the tongue permitting rotation of the slider body about a yaw axis in a plane generally parallel to the surface of the disc.

15. The slider of claim 14, including compliant shear means attaching a top surface of the slider body opposite the air-bearing surface to the tongue, the shear means being compliant to permit the slider body to rotate about the yaw axis.

16. The slider of claim 14, including a lubricant between the slider body and the tongue.

17. The slider of claim 1, wherein the flexure is attached to an actuator arm of the disc drive, the flexure including a tongue supporting the tab that is generally parallel to the surface of the disc, and wherein the microactuator comprises:
   first and second conductive bond pads;
   a first conductive terminal having first conductive teeth associated therewith, coupled to the first bond pad;
   a second conductive terminal having second conductive teeth associated therewith, coupled to the second bond pad;
   a plurality of piezoelectric layers interdigitated between the first and second conductive teeth;
   means for attaching a first end tooth of the first conductive teeth to the tab; and
   means for attaching a second end tooth of the second conductive teeth opposite the first end tooth to the slider body.

18. A disc drive comprising:
   a rotatable recording disc containing a plurality of concentric recording tracks;
   an actuator assembly comprising an actuator arm, a flexure supported by the actuator arm and a slider supported by the flexure, the slider having an air-bearing surface generally parallel to and confronting a surface of the disc and the flexure having a tab with a surface generally normal to the surface of the disc, and the slider having
      a leading surface generally normal to the air-bearing surface;
      a trailing surface generally normal to the air-bearing surface opposite the leading surface;
      a transducing head at the trailing surface for writing and/or reading data to and/or from the plurality of concentric recording tracks on the recording disc, and
      a microactuator between the leading surface of the slider and the tab; and
   a motor operatively connected to the actuator arm and operable to move the actuator assembly relative to the recording disc to coarsely position the transducing head relative to a selected one of the plurality of concentric recording tracks on the disc;
the microactuator being operable to apply force to the tab rotate the slider and displace the transducing head relative to the flexure to finely position the transducing head relative to the selected track on the disc.

19. The disc drive of claim 18, wherein the microactuator comprises:
   first and second conductive bond pads on the slider;
   a first conductive terminal having first conductive teeth associated therewith, coupled to the first bond pad;
   a second conductive terminal having second conductive teeth associated therewith, coupled to the second bond pad; and
   a plurality of piezoelectric layers interdigitated between the first and second conductive teeth.

20. The disc drive of claim 19, wherein the microactuator is a thin film microactuator and the transducing head is a thin film transducing head.

21. The disc drive of claim 19, wherein the slider and microactuator are formed separately, and including means laminating the microactuator to the slider.

22. The disc drive of claim 19, wherein the piezoelectric layers are arranged in a stack with successive piezoelectric layers of the stack being oppositely polarized so that application of a voltage to the first and second conductive bond pads causes the stack to expand or contract.

23. The disc drive of claim 19, wherein the piezoelectric layers are arranged in a stack with the piezoelectric layers of the stack being polarized to the same orientation so that application of a voltage to the first and second conductive bond pads causes the stack to bend, and further comprising hinge means attaching the stack to the slider body.

24. The disc drive of claim 23, wherein the hinge means includes a gap between the microactuator and the slider.

25. The disc drive of claim 18, further including a second microactuator between the leading surface and the tab, the first-named microactuator and the second microactuator being complementary to each other and offset on opposite sides of a central longitudinal axis of the slider, the first-named and the second microactuators being configured and arranged to apply force to the tab to rotate the slider and thereby displace the transducing head with respect to the flexure to finely position the transducing head relative to the selected track on the disc in response to control signals applied to the microactuators.

26. The slider of claim 18 wherein, the flexure includes a tongue supporting the tab that is generally parallel to the surface of the disc, and further comprising means attaching the microactuator to the tab, the tongue permitting rotation of the slider about a yaw axis in a plane generally parallel to the surface of the disc.

27. The slider of claim 26, including compliant shear means attaching a top surface of the slider opposite the air-bearing surface to the tongue, the shear means being compliant to permit the slider to rotate about the yaw axis.

28. A process for manufacturing a slider for attachment to a flexure on an actuator arm assembly of a disc drive, the flexure having a tab with a surface generally normal to a surface of a disc, the process comprising:

provi­ding a slider body having an air-bearing surface for confronting the surface of the disc, a leading surface normal to the air-bearing surface and a trailing surface normal to the air-bearing surface opposite the leading surface;

forming a transducing head on the trailing surface of the slider body by thin film deposition;

forming a microactuator on the leading surface of the slider body, the microactuator comprising a stack containing a plurality of thin film selectively polarized piezoelectric layers interdigitated with a plurality of conductive teeth layers, a first end layer of the stack being operatively supported by the leading surface of the slider body and a second end layer of the stack opposite the first end layer being operatively mounted to the surface of the tab to apply force to the surface of the tab to rotate the slider body and displace the transducing head with respect to tracks of a disc; and forming at least two conductive pads on the slider body, one of the conductive pads being electrically connected to a first group of alternate ones of the plurality of conductive teeth layers and the other of the conductive pads being electrically connected to a second group of alternate ones of the plurality of conductive teeth layers.

29. The process of claim 28, including forming a hinging element between a portion of the microactuator and the leading surface of the slider body, thereby forming a gap between a portion of the microactuator and the leading surface of the slider.

30. The process of claim 28, wherein an application of voltage to the piezoelectric layers polarizes all of the piezoelectric layers in the same direction.

31. The process of claim 28, wherein an application of voltage to the piezoelectric layers alternately polarizes the piezoelectric layers in opposite directions.

* * * * *

UNITED STATES PATENT AND TRADEMARK OFFICE
CERTIFICATE OF CORRECTION

PATENT NO. : 5,898,541
DATED : APRIL 27, 1999
INVENTOR(S) : ZINE-EDDINE BOUTAGHOU ET AL.

It is certified that error appears in the above-identified patent and that said Letters Patent is hereby corrected as shown below:

Column 10, line 14, delete "tab rotate", insert --tab to rotate--

Signed and Sealed this

Second Day of November, 1999

Attest:

Q. TODD DICKINSON

*Attesting Officer*    Acting Commissioner of Patents and Trademarks